United States Patent [19]

Sugawara et al.

[11] Patent Number: 5,714,227
[45] Date of Patent: *Feb. 3, 1998

[54] CAR INTERIOR MEMBER AND METHOD FOR PRODUCING THE SAME

[75] Inventors: Minoru Sugawara; Koki Hirano; Katsuhiko Tada; Tetsuya Nakamura, all of Ichihara, Japan

[73] Assignee: Idemitsu Petrochemical Co., Ltd., Ichihara, Japan

[*] Notice: The term of this patent shall not extend beyond the expiration date of Pat. No. 5,527,581.

[21] Appl. No.: 619,062

[22] Filed: Mar. 21, 1996

Related U.S. Application Data

[63] Continuation-in-part of Ser. No. 307,935, Sep. 16, 1994, Pat. No. 5,527,581.

[30] Foreign Application Priority Data

Sep. 17, 1993 [JP] Japan .................... 5-231456

[51] Int. Cl.$^6$ ........................................ B32B 9/00
[52] U.S. Cl. .................. 428/71; 428/35.7; 428/120; 428/124; 428/126; 428/159; 428/161; 428/192; 428/217; 428/304.4; 428/309.9; 264/46.5; 264/134; 264/240; 264/257
[58] Field of Search ................... 428/35.7, 120, 428/71, 124, 126, 159, 161, 192, 217, 304.4, 309.9; 264/45.2, 46.5, 134, 240, 257

[56] References Cited

U.S. PATENT DOCUMENTS

| | | | |
|---|---|---|---|
| 5,071,605 | 12/1991 | Kawaguchi et al. | 264/45.2 |
| 5,188,882 | 2/1993 | Uchiyama et al. | 428/159 |
| 5,318,822 | 6/1994 | Rhodes | 428/120 |
| 5,527,581 | 6/1996 | Sugawara et al. | 428/71 |

FOREIGN PATENT DOCUMENTS

61-48822  4/1986  Japan.

Primary Examiner—Patrick Ryan
Assistant Examiner—Abraham Bahta
Attorney, Agent, or Firm—Flynn, Thiel, Boutell & Tanis, P.C.

[57] ABSTRACT

Tubular parison of a molten resin to such an extent as to melt undergoes a pre-blow with a blow molding apparatus, whereupon the blown tubular parison is clamped between dies of a blow molding apparatus, and also, is mutually weld together with parts of the inside faces of the tubular parison to form a multiple of isolated hollows in the parison. Gas is fed through a multiple of gas feed nozzles which are provided in the die into the hollow portions. A number of the hollow portions are opened in a second process to form a functional part.

22 Claims, 8 Drawing Sheets

CAR INTERIOR MEMBER AND METHOD FOR PRODUCING THE SAME

This is a continuation-in-part of U.S. Ser. No. 08/307 935, filed Sep. 16, 1994, now U.S. Pat. No. 5 527 581.

BACKGROUND OF THE INVENTION

1. Field of the Invention

This invention relates to a car interior member and a method for producing the same, and intends particularly to be used to produce an instrument panel in the front area of a car, a rear-board unit in the rear area of a car, a door trim, a console unit, and various lids.

2. Description of the Related Art

Conventionally, the car interior members such as the instrument panel have been advancing in resinification to comply with the requirements of moldability, adaptability in shape, design, corrosion resistance and weight reduction, and more particularly, a polyolefin resin material such as polypropylene has been employed to satisfy the requirements of high-temperature properties and stiffness properties for the car interior member.

A car's interior member, especially the instrument panel is provided with multiple functional parts holding some functions such as ducts and meter clusters, and its shape being rather complex.

Accordingly, under the present circumstances, a main body member and every functioning member defining the car interior member are separately formed, thereafter the car interior member can be assembled with separately prepared parts. In this case, a part comprising of the main body member is usually produced by injection molding. But, there are disadvantages in that high injection pressure is required from the point of view that these parts consist of relatively large moldings in the ease of the adoption of the injection molding method, and further, a large injection molding apparatus and a mold having high endurance and high pressure for clamping the mold are required.

The above polyolefin resin material such as polypropylene used in many cases for the car interior member, especially, a polypropylene type resin having sufficient strength, rigidity and heat resistance, is not applicable in large-scale blow molding because of its unsatisfactory blow moldability such as with drawdown resistance. Therefore, an external appearance of a molding tends to be inferior even if the drawdown resistance is improved by an increase in molecular weight. Accordingly, the blow molding has been applied in a limited way only to members not exposed from the surface of the car interior, which does not require a satisfactory external appearance or having a comparatively small functional part, such as a duct or the like.

Figure 11:
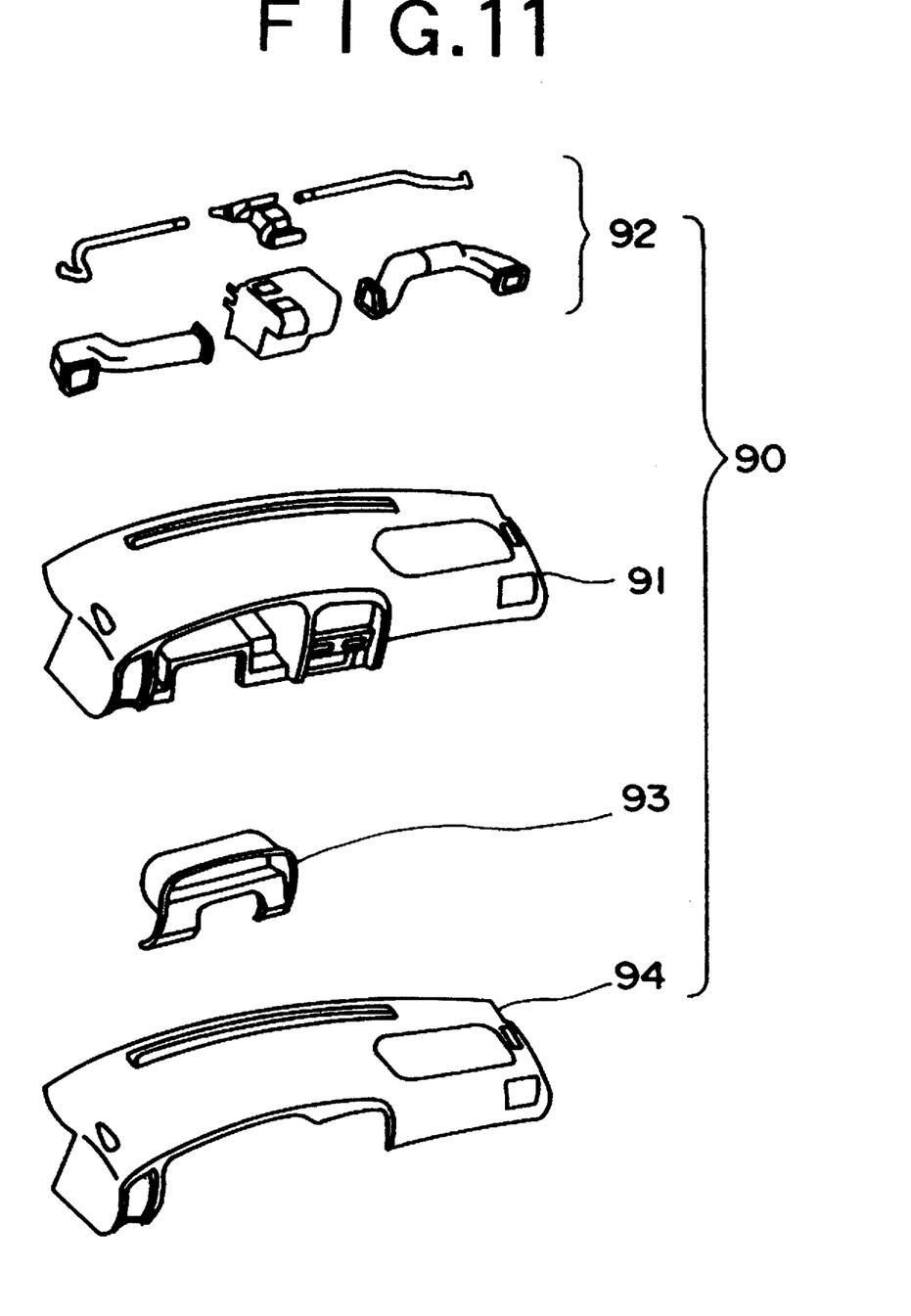
FIG. 11 is a perspective view of a conventional car interior member.

FIG. 11 depicts parts produced by a conventional production method for the car interior member and a production method for an instrument panel 90 by assembling the parts by producing them using the conventional method as an example.

The instrument panel 90 is arranged with a main body member 91 forming the main structure of the front area of the car interior, a duct 92 as a functional part applied in the main body member 91, a meter cluster 93 and a surface member 94.

The main body member 91 is produced by injection molding by using a modified resin of PPO (polyphenylene oxide) (Trademark; "NORYL"), PPF (filler filled polypropylene), or PPG (glass fiber reinforced polypropylene).

The duct 92 is provided for an air-conditioner, heater, defroster received in the main body member 91 and is produced by blow molding by using PP (polypropylene), or PP/EPR (polypropylene/polyethylene-propylene rubber).

The meter cluster 93 is a member surrounding several meters such as a speedometer and is formed by injection molding with ABS (acrylonitrile-butadiene-styrene resin), a modified resin of PPO (polyphenylene oxide) (Trademark; "NORYL"), or PPG (glass fiber reinforced polypropylene).

The surface member 94 is to be the outer-most side of the instrument panel 90, which is defined by a surface layer made from PVC (polyvinylchloride) and a foamed layer made from foaming polyurethane and laminated on the inside of the surface layer, and is produced by means of slash molding or thermoforming.

The instrument panel 90 is assembled with the parts produced individually from respective materials and by different producing methods.

However, in the conventional production method for the car interior member like the production method for the instrument panel 90 depicted in FIG. 11 above, the number of parts has been increased to form individually the main body member composing the main structure in certain areas of the car interior and the functional pan has a particular function attached in the main body member.

Therefore, the cost, was expensive to provide materials, dies, and molding apparatus for each part and to manage such members efficiently, was the subject matter.

It was the subject matter that the manufacturing process took a great deal of time and productivity levels were insufficient, because the process for both producing and assembling each part was required when the car interior member had been manufactured.

Additionally, difficulty in recycling was a subject matter because individually produced parts have been made from different materials (resins) and combined parts have not been able to be recycled collectively.

In the case of recycling, the necessity of frequent processing and the cost for collecting separated parts was also a subject matter.

There is a method (EP-A-274535) for forming a main body of a meter panel for a car to be of a sectional box-shape having closed upper and bottom sides and a hollow therein by blow molding as a conventional method for producing the car interior member. It is mentioned that, in this case, the hollow is used as are vent.

The number of hollows in the aforementioned conventional example is one, therefore, it is thought that the main body of the meter panel for the car is produced by using parison of 100% which is extruded into the cavity of the dies as a process for producing a general container. In the aforementioned structure, the main body of the meter panel for the car cannot be produced in a complicated configuration that results in insufficient strength, rigidity and so on. And, the duct cannot be formed to be in the configuration as shown in FIG. 11, with the result that each function cannot be obtained. Therefore, in this conventional example, it is out of touch with the actual type of meter panel used for the car.

Further, as another conventional example of the method for producing the car interior member, a method (Japanese Utility Model Application Laid-open No. Sho 61-48822) is given as an example, in which a soft pad is adhered on the upper portion of a hollow panel made of resin by blow molding in order to protect from collision damage, and a suction port and a blow port connecting an air duct are formed in the hollow panel.

In the aforementioned conventional example as in the case of the conventional example described as EP-A-274535, the number of formed hollows is only one, therefore, the required complicated configuration of the panel cannot be produced.

The present invention has an object to supply the car interior member and its molding method that can reduce the number of parts and improve recycling.

SUMMARY OF THE INVENTION

The present invention is intended to achieve the aforementioned object by using blow molding in which tubular parison is clamped between molds to form a multiple of isolated hollows, and gas is fed through a gas feeding nozzle into the hollows.

Specifically, a method for producing a car interior member according to the present invention, is characterized in that a tubular parison of a molten resin is pre-blown, the tubular parison between a pair of dies is clamped and portions of the inside faces of the tubular parison is mutually welded to form multiple isolated hollow portions in the parison, the tubular parison is blown by feeding gas from a gas feed nozzle provided in the die into each hollow portion, and a blow molding having a specified configuration is obtained.

After the blow molding is obtained, the car interior member is produced to form a functional part by causing at least one of a multiple of hollow portions to have at least one opening. The functional part may be a duct. The duct is formed by opening more than two portions of the hollow portion corresponding to the duct having a multiple of hollow portions after the blow molding is obtained.

In the method for producing the car interior member according to the present invention, it is characterized that the blow moldings molded in a state in which a surface member is set on at least one face of a cavity of the dies.

The blow molding may be an instrument panel provided to the frontal area of the car interior.

Further, the blow molding may be molded with a single layer, and also, may be molded with more than two layers which are from a base layer placed in the inner-most side to a surface layer placed in the outer-most side, in which, more than two layers including at least the base layer may be formed by a multi-layer blow molding.

Thus in, the present invention, by extruding a die of the blow molding apparatus, a type or multiple of types of resin is extruded with a single layer or a multi-layer in a melted state to form the tubular parison, and then the extruded tubular parison undergoes the pre-blow, and is clamped between the mold portions. In this case, the two dies have a unique configuration, for example, by forming a small clearance and a large clearance between the cavities in the closed state of the mold, parts of the opposite inner faces of the tubular parison in correspondence to the small clearance in the cavities are mutually welded, and parts of the inside of the tubular parison in correspondence to the large clearance in the cavities form a multiple of isolated hollows by following the contour of the inner face of the cavity. Feeding gas into the hollows, the blow molding having a multiple of isolated hollows is molded.

According to the present invention as structured above, the car interior member, including a multiple of hollows which are used as the functional part, is unitedly formed with the blow molding, whereby the number of members is reduced as compared with a conventional example in which the main body of the car interior is separately formed from the functional part for each function provided in the main body.

The whole part is formed by blow molding, so that the parison is pressed against the inner face of the cavity of the dies while the blow molding is cooling, whereby sinkage caused by injection molding is not produced on the surface and satisfactory transferring surface quality is obtained.

The blow molding is formed with a polyolefine type resin material, whereby a blanket type recycling process can be carried out, resulting in an easier recycling process.

The car interior member is a structure having a multiple of isolated hollows which are used as the functional part, whereby the car interior member can be formed to be a complicated configuration corresponding to actuality by forming these hollows to be of suitable configuration. That is, the structure of each pan can essentially be similar to an assembled structure by using a multiple of conventional parts.

Applying the car interior member to an instrument panel, the instrument panel especially having a number of members, whereby, conspicuous effects of the present invention can be obtained, resulting in the achievement of the aforementioned object.

Further, if the blow molding is carried out in the state which the surface member is previously set between the cavities, the surface member can be suitably provided.

BRIEF DESCRIPTION OF THE DRAWINGS

FIG. 9 (A) to FIG. 9 (D) are diagrammatic views for explaining a molding method of the car interior member of the preferred embodiment according to the present invention;

FIG. 10 (A) and FIG. 10 (B) respectively are horizontal sectional views showing steps for producing the car interior member using a pair of dies.

DETAIL DESCRIPTION OF THE PREFERRED EMBODIMENT(S)

The preferred embodiment of the present invention will be described with reference to the drawings.

Figure 1:
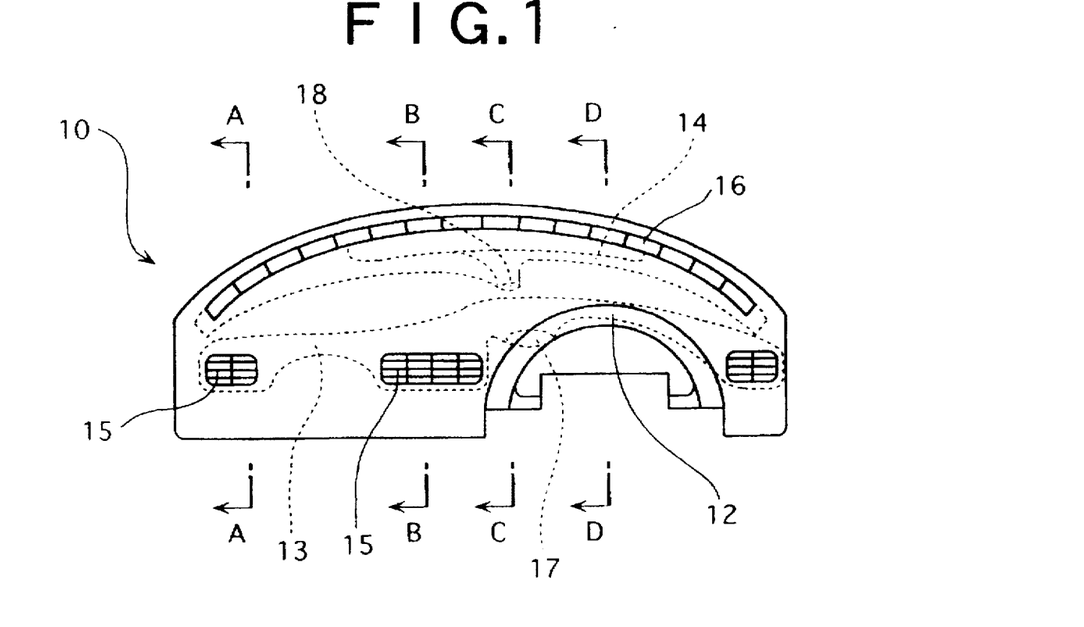
FIG. 1 is a front view showing a car interior member (an instrument panel) of a preferred embodiment according to the present invention.
Figure 2:
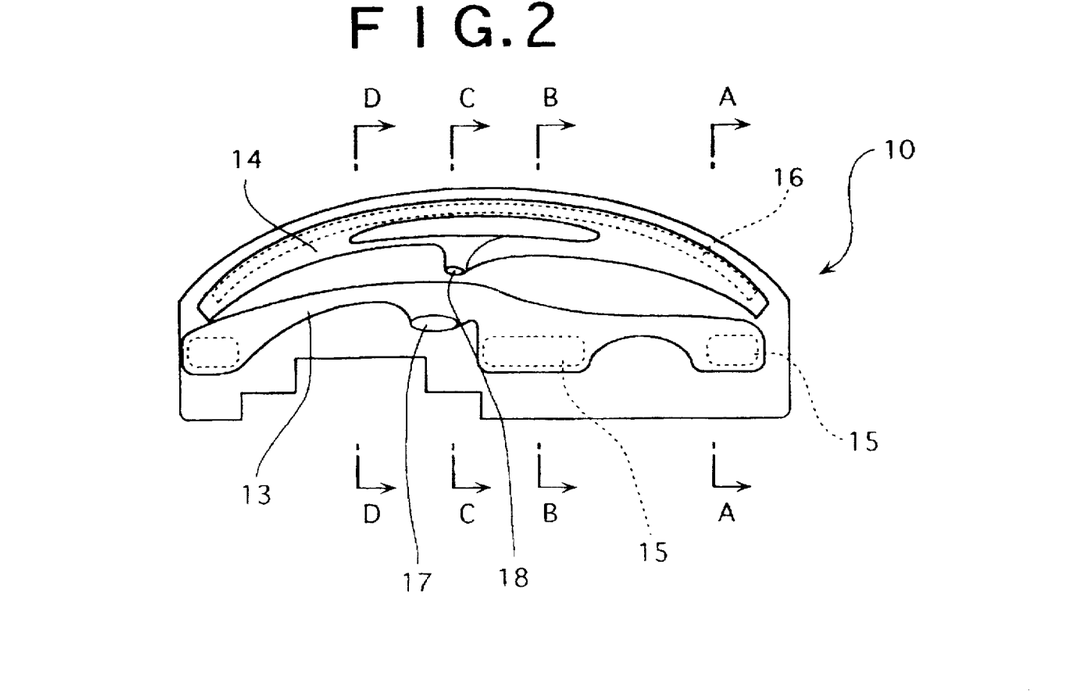
FIG. 2 is a rear view showing the car interior member of the above embodiment.
Figure 3:
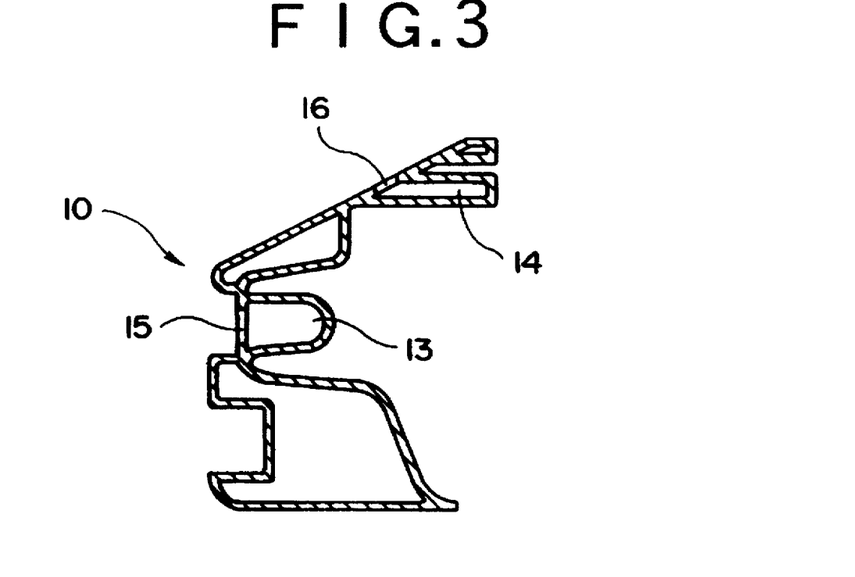
FIG. 3 is a sectional view of the point A in FIGS. 1 and 2 of the above embodiment.
Figure 4:
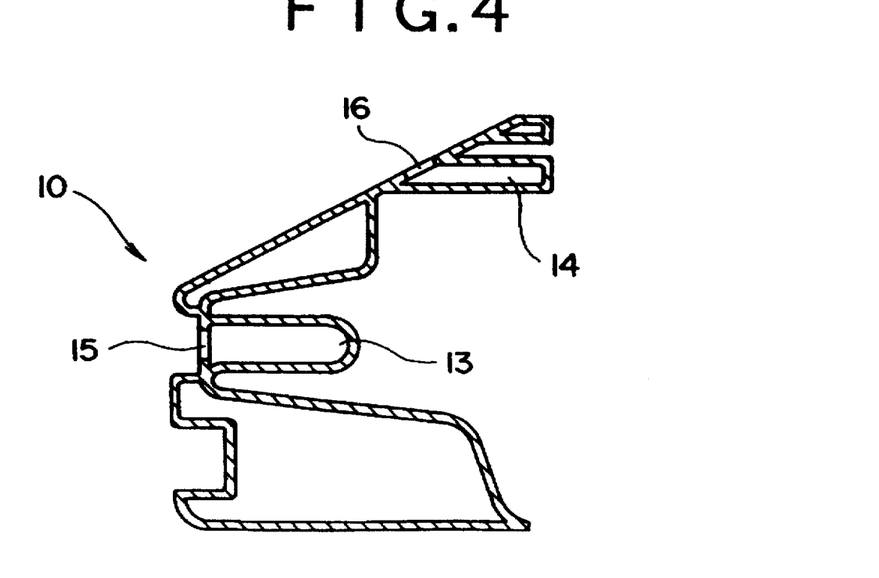
FIG. 4 is a sectional view of the point B in FIGS. 1 and 2 of the above embodiment.
Figure 5:
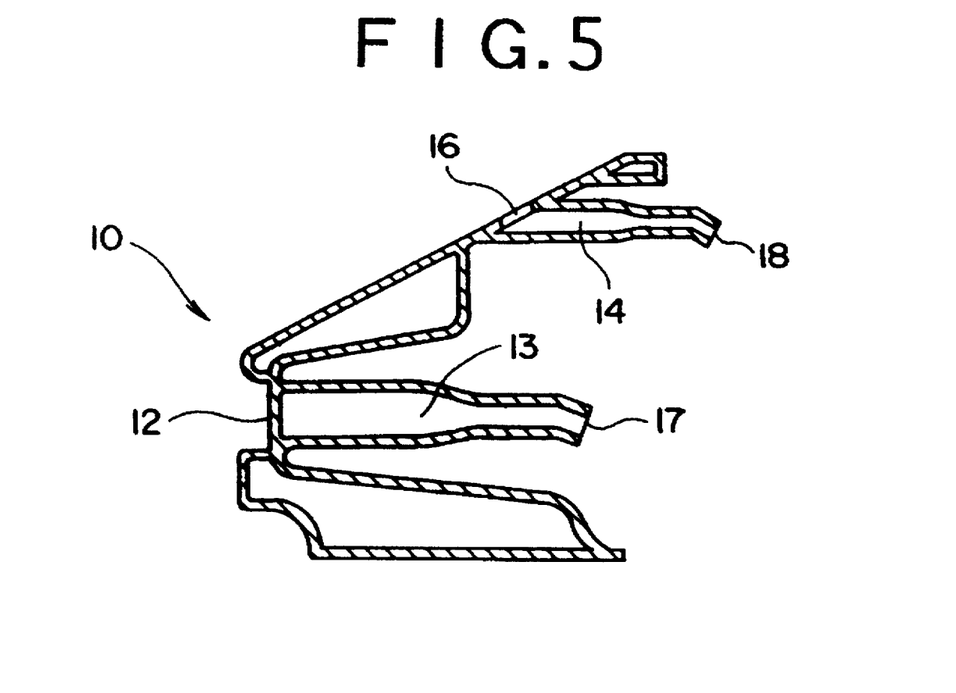
FIG. 5 is a sectional view of the point C in FIGS. 1 and 2 of the above embodiment.
Figure 6:
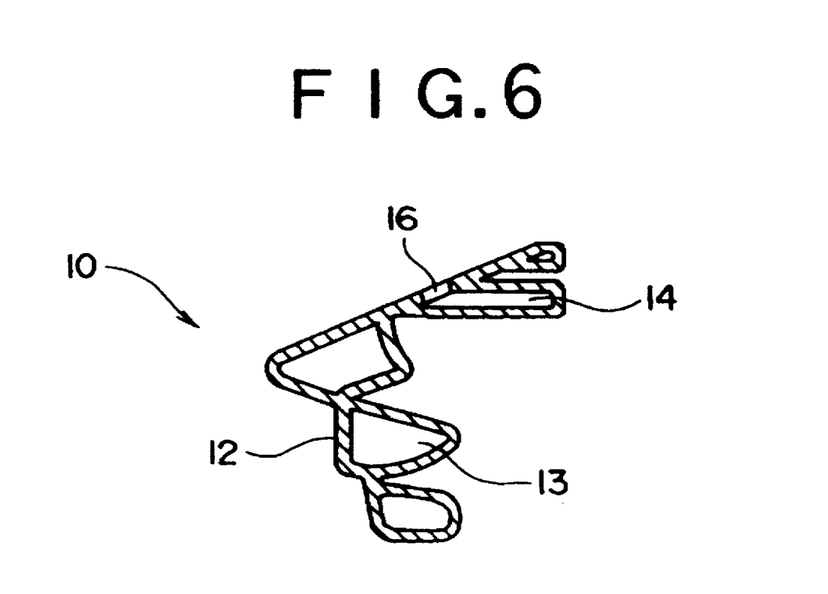
FIG. 6 is a sectional view of the point D in FIGS. 1 and 2 of the above embodiment.

From FIG. 1 to FIG. 8 depict an instrument panel 10 as the interior member relating with this embodiment according to the present invention. FIG. 1 depicts a front view (view looking from the driver's seat) of the instrument panel 10, FIG. 2 depicts a rear view, FIGS. 3, 4, 5, and 6 respectively depict sectional views at points A, B, C and D in FIGS. 1 and 2, and FIGS. 7 and 8 each depict an enlarged view of a part of FIG. 3.

In those drawings, the instrument panel 10 is a blow molding formed, which includes a meter cluster section 12 for laying every meter, a duct 13 for the car interior temperature control, and a duct 14 for a defroster to defrost.

The ducts 13 and 14 are respectively placed in the rear face of the instrument panel 10 to blow air for the defroster or for the car interior temperature control to the inside of the car or a windshield.

The meter cluster 12 is a functional part holding a function for attaching a meter and the like (not-shown), which is structured to have a hollow portion. The meter cluster 12 is formed to open a part of the blow molding by cutting after the blow molding is taken out from the mold.

The ducts 13 and 14 are functional parts each holding a function for ventilating air, in which are structured to have the hollow portions. The ducts 13 and 14 are generally formed to have blow way out 15 and 16, and supply way in 17 and 18 to continue to the hollow portion by cutting a part of the blow molding after the blow molding is taken out from the mold.

Figure 7:
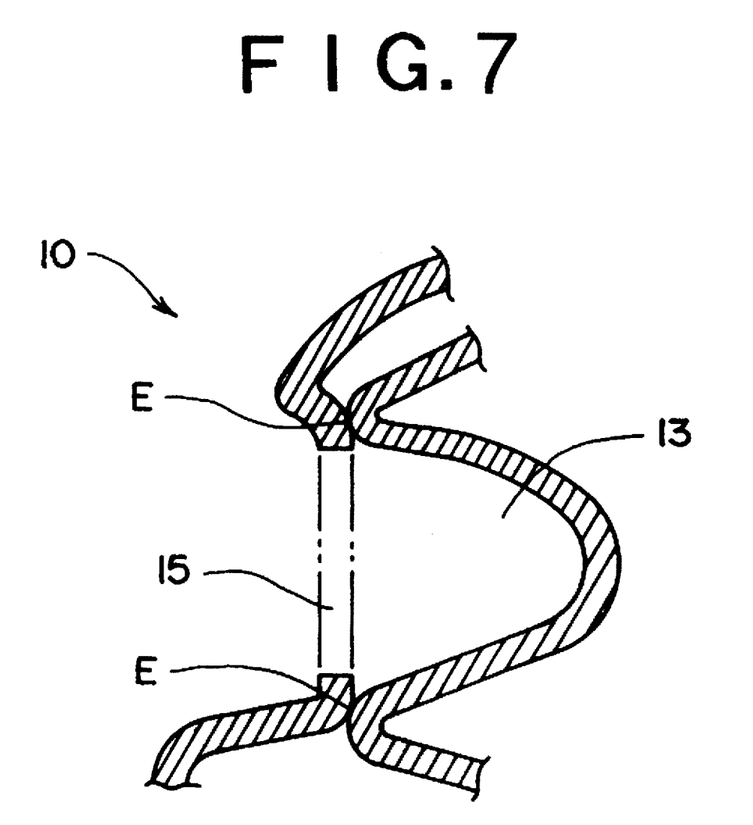
FIG. 7 is an enlarged view of a part of FIG. 3 in which the car interior member is formed with a single layer.

In FIG. 7, the instrument panel 10 is formed with a single layer. A surface member (not-shown) can be provided on the surface of the instrument panel 10 formed with the single layer.

Raw materials for the instrument panel 10 are not intended to be especially limited, but it is preferable to use thermoplastic resin; (1) a polyolefine type resin material, such as polypropylene and polyethylene, (2) a polyester type resin material, such as polyethylene terephthalate and polybutylene terephthalate, (3) polycarbonate, (4) polyamide, or (5) a compound of the aforementioned (1) to (4).

Further, the aforementioned material can be compounded with, e.g., ethylene-α-olefin copolymerizated elastomer, styrene-diene type elastomer, hydrogenated thereof or polyolefine modified with unsaturated carboxylic acid, such as maleic anhydride, and the aforementioned resin can be blended with, e.g., inorganic filler, such as talc, mica and calcium carbonate, and fibrous filler, such as glass fiber and carbon fiber. The selection of the aforementioned resins and compounds can take place suitably in consideration of the kind and size of the formed interior member.

And, above all, a polyolefine type resin material, more preferably, an individual resin of a polypropylene type, light -density polyethylene or a polypropylene type resin, is used as a composite by being added with polyethylene of high-density, ethylene-α-olefin copolymerizated elastomer, styrene-diene type elastomer or hydrogenated thereof. For improvement in rigidity, inorganic fiber such as talc can be added therein.

In detail, as a polypropylene type resin, a propylene-ethylene block copolymer whose melt index: MI=0.1–1 g/10 min. [230° C., 2.16 Kgf], isotactic pentad ratio of a homopolymerizated product is more than 90%, preferably, more than 91% is used. As a composition including the block copolymer as a principal constituent, there are two types; one is composed of (A) a propylene-ethylene block copolymer MI=0.1–1 g/10 min. [230° C., 2.16 Kgf], (B) a high-density polyethylene MI=0.001–0.1 g/10 min. [190° C., 2.16 Kgf], and (D) talc (a particle diameter: 0.1–10 μm), or the other is composed of (A) a propylene-ethylene block copolymer MI=0.1–1 g/10 min. [230° C., 2.16 Kgf], (C) elastomer MI=0.2–10 g/10 min. [230° C., 2.16 Kgf], and (D) talc (a particle diameter: 0.1–10 μm). In this case, (A) a propylene-ethylene block copolymer is 50–100 wt %, 60–97 wt % being more preferable, (B) a high-density polyethylene or (C) elastomer is 0–40 wt %, 2–30 wt % being more preferable, and (D) talc is 0–30 wt %, 1–20 wt % being more preferable. Incidentally, each ratio of the composition is defined to be the total amount of 100 wt %.

Figure 8:
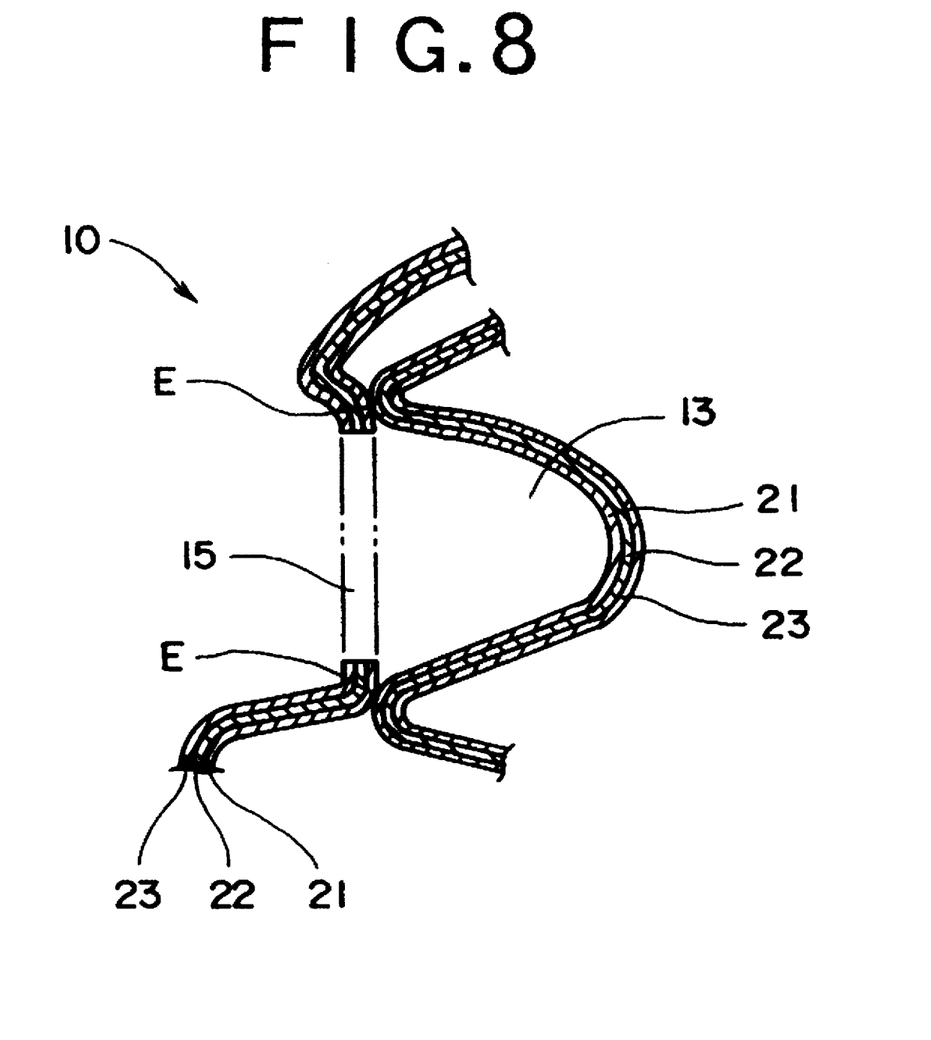
FIG. 8 is an enlarged view of a part of FIG. 3 in which the car interior member is formed with a multiple of layers.

As shown in FIG. 8, the instrument panel 10 may be formed to hold a multiple of layers.

That is, the instrument panel 10 holds a three-layer structure which are a base layer 21 in the inner-most side, a foamed layer 22 placed outside of the base layer 21 and a surface layer 23 of the outer-most side (side of surface), in which the three layers are simultaneously formed by multi-layer blow molding.

The base layer 21 is made from polyolefin resin material or better still made from polypropylene resin material and might be composed of the polypropylene resin material and inorganic filler (talc, mica, calcium carbonate and others), glass fiber or elastomer (more suitably an olefin type elastomer) to improve high-impact properties.

The base layer 21 keeps the shape of the instrument panel 10 and bestows mechanical properties having stiffness properties or high-impact properties.

The thickness of the base layer 21 is 0.5–15 mm or better still 1–10 mm.

Desirable instances of concrete organization of components of the base layer 21 are enumerated (A) propylene-ethylene block copolymer 66–99 wt % in melt index 0.1–1.0g/10 min. and in isotactic pentad ratio of propylene homopolymer more than 90%, (B) high-density polyethylene 5–30 wt % in melt index 0.001–0.1 g/10 min., (C) elastomer 5–30 wt %, (D) inorganic filler 5–30 wt %, that has an average particle diameter of less than 10μm in a powder or a fibrous state. By using the blow molding resin material including above (A), (B), (C) and (D), the large blow molding can be facilitated, and satisfactorily molded products with rigidity and mechanical properties can be obtained. Each ratio of the composition is defined to be the total amount of 100 wt %.

The surface layer 23 is made from the polyolefin type resin material which is capable of using polyolefin resin such as polyethylene, polypropylene and polybutene-1 or a polyolefin type elastomer such as ethylene-propylene copolymer elastomer and ethylene-propylene-diene copolymer elastomer, or may be a composition or cross linked compound thereof or further various fillers can be added therein. A thermoplasticity polyolefin type elastomer (TPO) or a resin including powder from hide is preferable.

The surface layer 23 bestows the design, the sense of quality, the sense of feel and the sense of luxury which are caused by transferring surface grain quality to the instrument panel 10.

The thickness of the surface layer 23 is 0.3–10 mm. or 0.5–5 mm is more desirable.

The foamed layer 22 is made from the foamed material of the polyolefin type resin material which is capable of using a polyolefin type resin such as polyethylene, polypropylene or polybutene-1. Polyolefin elastomer such as ethylene-propylene copolymer elastomer and ethylene-propylene-diene copolymer elastomer, the compound thereof or the cross linked compound thereof. Thermoplastic polyolefin type elastomer (TPO) is suitable, more preferable however, the usage of thermoplastic polyolefin elastomer (TPO) compounded with polyolefin type elastomer, such as ethylene-propylene copolymer elastomer and ethylene-propylene-diene copolymer elastomer.

The foamed layer 22 bestows sound insulation, the deluxe sound on tapping and the damping on the instrument panel 10.

The thickness of the foamed layer 22 is 0.5-5 mm, more preferably 1-10 mm.

Satisfying the instance of concrete components of the foamed layer 22 is enumerated thermoplastic polyolefin type elastomer with an ethylene content of 5-30 wt % within the range of isotactic index 50-90 % by the boiling of n-heptane extraction and the range of melt index 0.1-5 g/10 min. In this case, a greater melt index range than shown above is not preferable because the forming up ratio is insufficient for low viscosity on making the foamed layer, and a lower range than shown above is not preferable because flow characteristics are unsatisfactory in the forming process. When the isotactic index is greater than the above range, its sense of softness is lost on becoming a product, but when the range of isotactic index is lower than the above, the foaming up ratio is insufficient for low viscosity.

The foamed layer 22 can be reasonably used olefin type copolymer elastomer within the range of a mooney viscosity ($ML_{1+4}100°$ C.) 40-90 with a propylene content amounting to 45-70 w%. When the range of propylene content is greater than the above range, the stiffness of the elastomer increases, therefore, the sense of softness is spoiled on the completion of the product. When the range of moony viscosity is lower than the above range, an orientation layer is easily formed because of shearing in the forming process, therefore, the stiffness properties and rigidity of the product is increased by the orientation, with the result that the sense of softness is spoiled, on the other hand, a range greater than the above mooney viscosity causes the foaming up ratio to be insufficient on making the foamed layer.

The foamed layer 22 can be suitably used for compounding the above thermoplastic olefin elastomer and olefin type copolymer elastomer.

A method of foaming the foamed layer 22 is adaptable to make the foam on forming to compound the foaming agent in the range of decomposition temperature of 150°-250° C. and a resin composition 0.5-6 parts by weight. For example, 4 parts by weight of Polyethylene EE-207 (name of product), made by EIWA KASEI KOHGYOH, Inc., in the decomposition temperature 210° C. is blended as the foaming agent to make the foam. Incidentally, in the case of using a multi-layer having the foamed layer, a two-layer structure having a foamed layer on the inside of the base layer can be used, otherwise a three-layer structure which the surface layer is laminated on the outside of the two-layer structure can be adopted.

A method of producing the car interior member according to the embodiment of the present invention will be explained with reference to FIGS. 9 (A) to (D) and FIG.10 Incidentally, FIGS. 9 (A) to (D) show diagrams for explaining the molding process, so that the formed configuration of the instrument panel 10 is not shown therein in detail.

FIG. 9 (A) shows a brief overview of a blow molding apparatus 30 for molding the instrument panel 10 as the car interior member. The blow molding apparatus 30 includes molds 31 and 32 which receptively have cavities 31A and 32A and are provided to close by moving to and away from each other, an extruding die 33 extruding the tubular parison of a state melted resin to such an extent as to weld between the cavities 31A and 32A, and a block system 34, closing the lower end of a tubular parison 10A extruded by the extruding die 33.

Figure 9A:
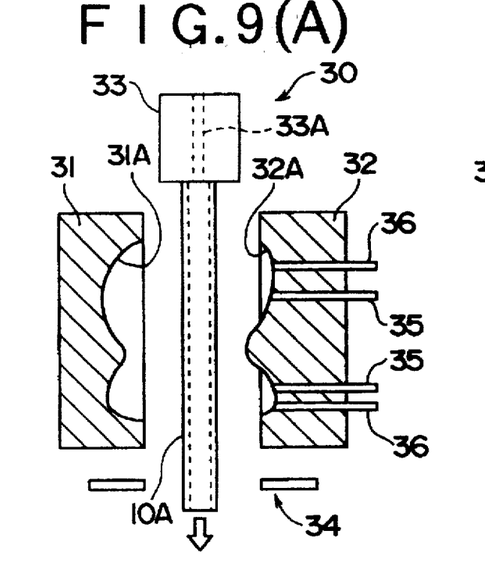
Figure 9B:
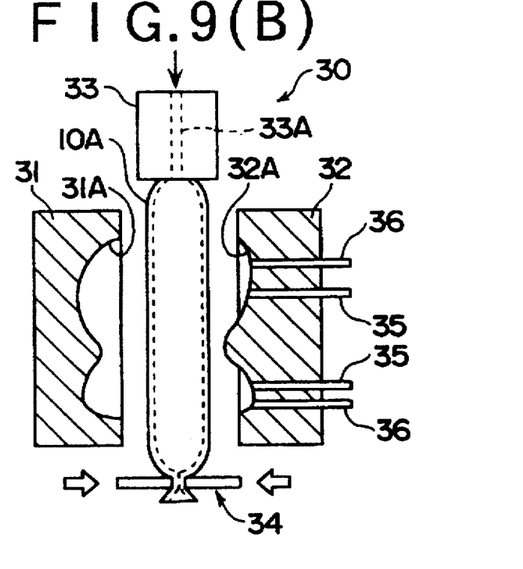

A multiple of feeding nozzles 35 in order to feed gas (e.g. air) into the tubular parison 10A, and a multiple of exhaust nozzles 36 in order to exhaust from the inside of the tubular parison are provided in at least one of the dies 31 and 32. The exhaust nozzle 36 is provided in order to cool the temperature of the molding to move air in the tubular parison by exhausting high-temperature air in the blow molding placed between the dies 31 and 32. The cavities 31A and 32A in the molds 31 and 32 are formed to have a unique configuration, that is clearance is provided between the cavities to have two distances, a short distance and a great distance between the cavities 31A and 32A of the closed dies.

The extruding die 33 has a function which can change the distribution thickness of the extruded tubular parison 10A in the circumferential direction and the longitudinal direction of the mold in order to correct the thickness of the parison which is changed by the weight of the tubular parison 10A or the configuration of the molding.

The extruding die 33 has an air blowing nozzle 33A in order that a pre-blow takes place to the tubular parison 10A.

In the opening state of the dies 31 and 32, a melting tubular parison 10A is fed from the extruding die between the cavities 31A and 32A.

Next, as shown in FIG. 9 (B), the bottom of the tubular parison 10A is clamped by using the block system 34, and then, the parison 10A is expanded with the pre-blow in which air is fed from the air blowing nozzle 33A provided in the extruding die 33 into the tubular parison 10A.

Figure 9C:
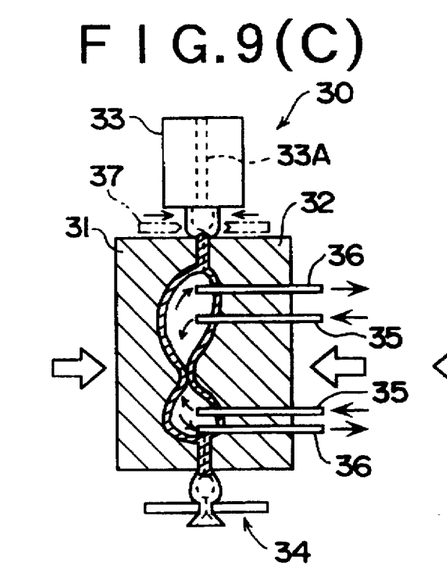
Figure 10A:
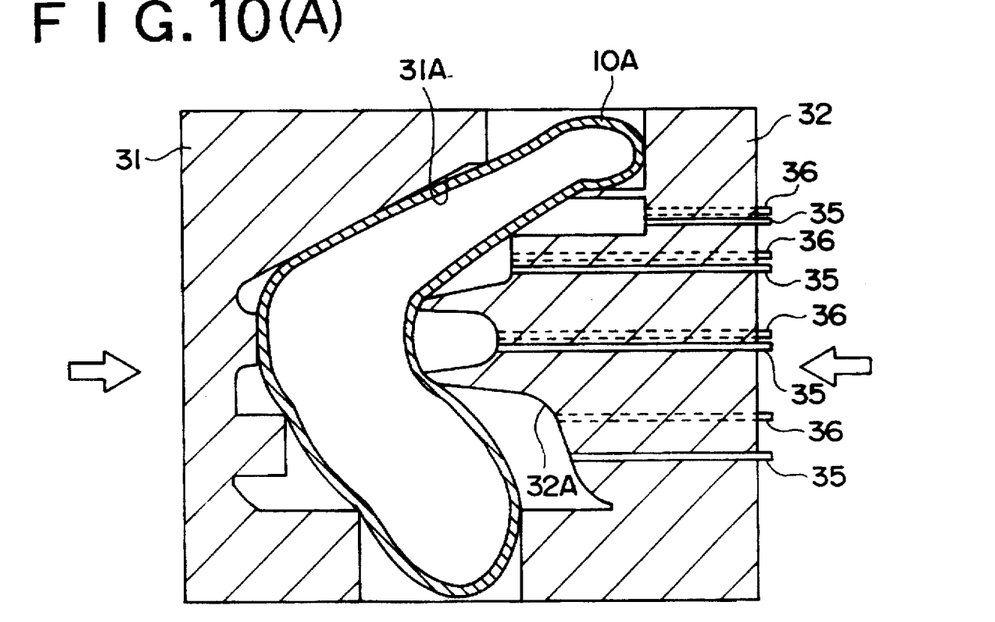
Figure 10B:
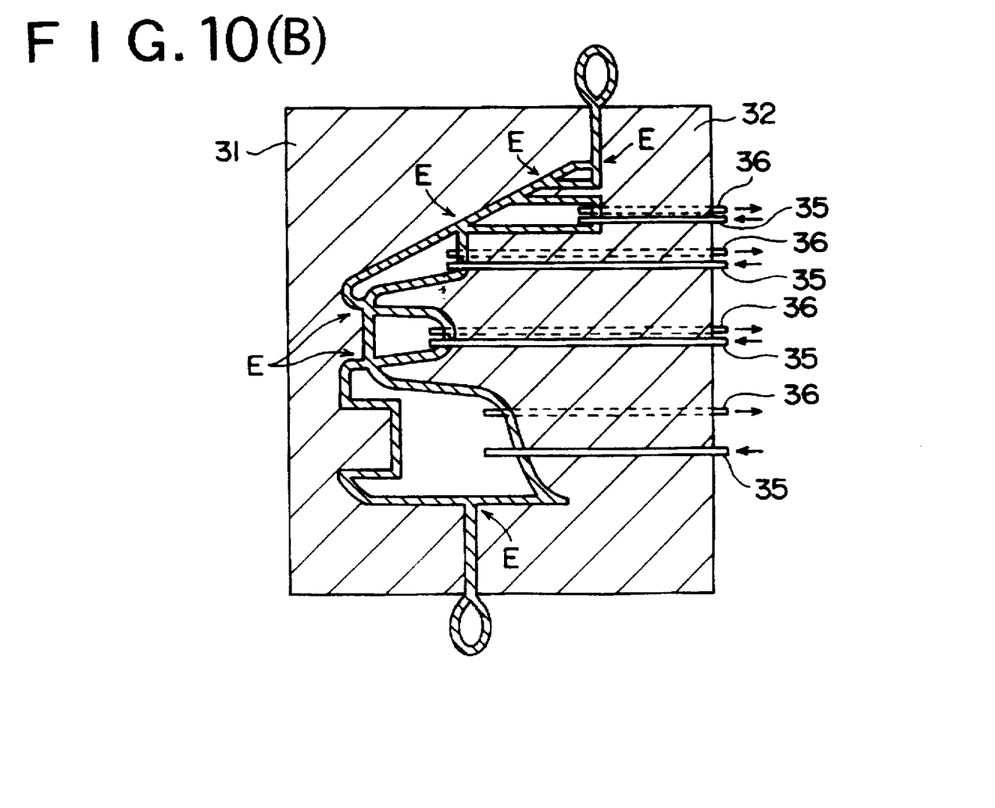

Further, as shown in FIG. 9 (C), moving the dies 31 and 32 to be close to one another, as shown in FIG. 10 (A), the tubular parison 10A follows its configuration to approximately correspond with the surface configuration of the cavities 31A and 32A of the dies 31 and 32. When the dies 31 and 32 are completely closed, a part of the tubular parison 10A is pressed and mutually welded at the aforementioned clearance having the short distance in the cavities 31A and 32A of the dies 31 and 32 (see FIG. 7, FIG. 8 and FIG. 10 (B) point E), whereby a multiple of hollow portions are formed therein.

After closing the dies, the feeding nozzle 35 and the exhaust nozzle 36 are moved forward to break through the wall of the tubular parison 10A (see FIG. 10 (B)). The feeding nozzles 35 are provided to correspond with all hollow portions, but the exhaust nozzles 36 are provided to correspond with only large hollow portions.

Figure 9D:
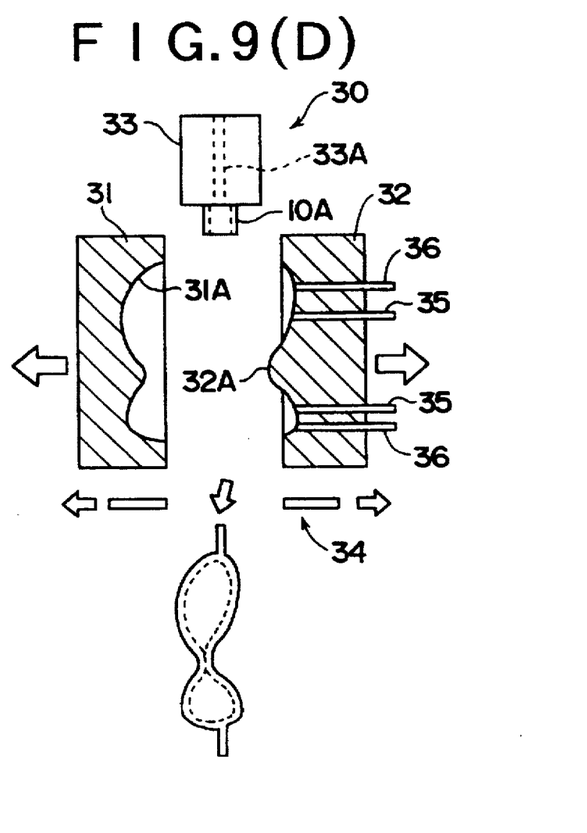

After that, a blow takes play to feed air from the feeding nozzle 35 into each hollow portion. Whereupon, the tubular parison 10A is positively altered in its configuration to be modeled along the surface configuration of the cavities 31A and 32A on the dies 31 and 32. By feeding cooling air therein, during maintenance of the pressure of air in the hollow portion, the blow molding is cooled by exhausting air that remains in the large hollow portion with the exhaust nozzle Further, after the tubular parison 10A is cut with a parison cutter illustrated with a reference numeral 37 in FIG. 9 (C), as shown in FIG. 9 (D), the feeding nozzle 35 and the exhaust nozzle 36 are removed from the tubular parison 10A, and the blow molding is taken out from the opened dies 31 and 32. The blow molding is formed with the blow way out 15 and 16 and the supply way in 17 and 18 by cutting the hollow portion corresponding to each duct to make openings with a second process, resulting in formation of the ducts and 14 as the functional parts. In order to form the meter cluster section 12 as the functional part, other hollow portions are opened. By the processes described thus far, the instrument panel 10 is produced, though, unnecessary fins formed during blow molding have to be removed from the exterior of the instrument panel 10.

Incidentally, in production of the instrument panel 10 formed with the single layer which is shown in FIG. 7, the surface member can be adhered to the instrument panel 10 after blow molding, but blow molding can also be in the state in which the surface member is previously set between the cavities 31A and 32A of the dies 31 and 32. Performing the blow molding in the state in which the surface member is previously set on at least one surface of the cavities 31A and 32A, the surface member can be suitably provided.

The instrument panel 10 can be molded by the usual blow molding method, and an instance of a molding condition is enumerated can be molded in screw 90 mmφ, die 300 mmφ, resin temperature 200°–240° C. and mold temperature 28° C. for using a blow molding machine 90 mmφ made by ISHIKAWAJIMA HARIMA KOHGYOH, Inc.

Following effectiveness is in the embodiment.

By unitedly forming the molding (the instrument panel 10) including a multiple of hollow portions used as the functional parts by blow molding, the number of parts can be reduced as compared with the conventional art.

And materials, dies, molding apparatus and others used for molding can be retrenched, and the management of these members can be made easier.

A process of molding can be retrenched on the occasion of manufacturing the instrument panel 10 with a fewer number of parts, and also the process of assembly can be deleted.

The instrument panel 10 is formed with a polyolefine type resin material, whereby a blanket recycling process can be carried out, resulting in an caster recycling process.

The ducts 13 and 14 formed for using the inner space of the instrument panel 10 can make a number of parts of the instrument panel 10 retrench and can simplify the inside structure of the instrument panel 10. Further, the different parts from the functional parts can be easily formed to be of a complicated structure, resulting in higher strength and The instrument panel 10 is a structure having a multiple of isolated hollows, whereby the instrument panel 10 can be formed to be a complicated configuration corresponding to the actual configuration by forming these hollows into a suitable configuration.

In the embodiment in which the car interior member is applied to the instrument panel 10, the instrument panel 10 in particular has a number of parts, therefore, conspicuous effects of the embodiment can be obtained.

As shown in FIG. 8, when the instrument panel 10 is structured to include the foamed layer 22, the instrument panel 10 can be obtained with sound insulation, the solid sound on tapping, vibration damping performance and so on, and further, the foamed layer 22 is simultaneously formed with the base layer 21 and the surface layer 23 by using the multi-layer blow molding as described above, whereby the increase of the number of parts and production processes, which is caused by providing the foamed layer 22, can be prevented.

Forming the three layers of the base layer 21, the foamed layer 22 and the surface layer 23 by using with a polyolefine type resin material, a blanket type recycling process can be carried out, resulting in an easier recycling process.

The present invention is not restricted within the above embodiment, but also other components that can realize the object of the present invention are included, that is the following transformation is included in the present invention.

In the embodiment shown in FIG. 8, the instrument panel 10 includes the foamed layer 22, but the structure with the base layer 21 and the surface layer 23 excluding the foamed layer 22 is possible.

The meter cluster 12 and the ducts 13 and 14 in the instrument panel 10 are integrally molded with the blow molding in the above embodiment, but it is unnecessary to integrally mold all functional parts, that is, the ducts 13 and 14 are integrally molded and the meter cluster 12 might be another part as in the past. But, it is advisable that as many functional parts as possible, more preferably, all functional parts are integrally molded, whereby the number of parts can be further reduced.

In the embodiment shown in FIG. 8, all three layers of the base layer 21, the foamed layer 22 and the surface layer 23 are molded with the polyolefin resin material, but each layers does not necessarily have to be molded with the polyolefin resin material. All layers which are molded with the polyolefin resin material, however, are desired because recycling can be collectively done and the work recycling process can be easily achieved.

The material of the base layer 21, the foamed layer 22 and the surface layer 23 is not restricted to the polyolefin resin material but is recommended in the case of the thermoplastic resin material for using the blow molding.

The structure whereby the instrument panel 10 holds the meter cluster 12, the ducts 13 and 14 and others as described in the above embodiment is not necessarily always such, for example, the instrument panel 10 might hold other functional parts such as a gloved box unit and the like. By cutting off a part of the hollow formed in the instrument panel 10, the gloved box unit having an accommodating function is formed.

The car interior member is assigned as the instrument panel 10 in the above embodiment, and in the present invention other interior members in the car such as the rear-board unit, the door trim, the console unit, and all lids can be accepted with this application.

Following comparative experiments were effected for ascertaining effect on the present invention.

Experiments 1–6 that were prepared as an instrument panel holding integral structure by blow molding in the embodiment of the present invention and Comparisons 1–3 that were prepared as an instrument panel usually holding a divided structure against Experiments 1–6 were compared with complete performance and function.

In Experiments 1 and 2, only the base layer 21 was molded with the single layer blow molding and was adhered to the surface layer 23. The foamed layer 22 was not provided.

In Experiment 1, an instrument panel as shown in FIG. 1, with a width of 1,400 mm, height of 400 mm and weight of 5.0 Kg, was formed. The base layer 21 was assigned with a compound of propylene-ethylene block copolymer 70 wt % (melt index 0.57g/10 min., ethylene content 1.9 wt %, isotactic pentad ratio 92 %), high-density polyethylene 10 wt % (melt index 0.03 g/10 min.), ethylene-propylene copolymer elastomer 10 wt % (mooney viscosity [$ML_{1+4}$100° C.]=70, propylene content 21 wt %), and talc 10 wt % (an average diameter of grain 1.5 micron). The surface layer 23 was assigned with thermoplastic propylene-ethylene block copolymer type elastomer with an ethylene content of 25 wt % in range within isotactic index 60 % for the boiling n-heptane extraction method and melt index 0.5 g/10min.

The condition for the blow molding is a screw of 90 mmφ, extruding die of 300 mmφ, resin temperature 200°–240° C. and mold temperature 28° C. for using a blow molding machine 90 mmφmade by ISHIKAWAJIMA HARIMA KOHGYOH, Inc., and a tubular parison length of 2,000 min.

The following is a procedure of the blow molding.

(1) The resin material of a weight corresponding to the parison extruded in the melted state by the blow molding apparatus is previously stocked in an accumulator, and then, the resin is extruded from the circular extruding die having a diameter of 300 mm to form the tubular parison having a length of 2,000 min. At the time, the dies are opened to 500 mm.

(2) The bottom of the tubular parison is clamped and the dies are closed while the air is blown from the extruding die into the parison to expand the parison.

(3) Therefore, each isolated hollow corresponding to the ducts and the meter cluster section is formed. By closing the dies, the gas feed nozzle breaks through the wall of the tubular parison.

(4) The gas feed nozzle breaking through the wall of the tubular parison feeds gas into the hollow portions. Further, gas is exhausted from the gas exhaust nozzle breaking through the wall of the tubular parison to cool the temperature of the molding. By feeding cooled air in the hollow portions, the inner pressure of the molding is maintained at 8 Kg/cm$^2$. Incidentally, gas blown into the tubular parison is used to be cooled at a temperature of −35° C.

(5) Blown gas is finished 210 seconds later after the mold portions are closed, and the air inside is removed.

(6) The molding is removed from the dies after they are opened, the ducts and the meter cluster section are formed by opening the hollow portions corresponding to the functional parts of the molding, the unnecessary fins are cut, and then the surface layer is adhered to the molding, resulting in the completed molding.

In Experiment 2, the base layer 21 was composed of glass fiber of 13 μm in diameter and 4 mm in length instead of talc in the base layer 21 of experiment 1. And, the surface layer 23 was assigned as the same as Experiment 1.

In Experiments 3–6, the three layer of the base layer 21, the foamed layer 22 and the surface layer 23 were molded by the multi-layer blow molding.

In Experiment 3, the base layer 21 was composed of high density polyethylene with a density 0.950 g/cm$^3$ and melt index 0.03 g/10 min. And the surface layer 23 was assigned as the same as Experiment 1. The foamed layer 22 was assigned with a composition that was of thermoplastic propylene-ethylene block copolymer type elastomer 50 wt % (ethylene content 25 wt %, isotactic index 60% by the boiling n-heptane extraction method, melt index 0.5 g/10 min.), and ethylene-propylene copolymer elastomer 50 wt % (propylene content 65 wt %, mooney viscosity [ML$_{1+4}$ 100° C.]=76).

In Experiment 4, the base layer 21 was assigned with propylene-ethylene block copolymer (ethylene content 1.9 wt %, melt index 0.57 g/10 min., isotactic pentad ratio 92%). The surface layer 23 and the foamed layer 22 were assigned as the same as Experiment 3.

In Experiment 5, the base layer 21 was assigned as the same as Experiment 1. The surface layer 23 and the foamed layer 22 were assigned as the same as Experiment 3.

In Experiment 6, the base layer 21 was assigned as the same as experiment 2. The surface layer 23 and the foamed layer 22 were assigned as the same as Experiment 3.

In Comparison 1, the whole of the main body member 91 in FIG. 11 and other functional parts were made by injection molding with PPF (filler filled polypropylene), and the surface member 94 (the foamed layer and the surface layer) was not provided.

In Comparisons 2 and 3, after the main body member 91 and other functional parts were molded with a modified resin (the name of the product, NORYL) of PPO (polyphenylene oxide), PPF (Filler filled polypropylene), and PPG (glass fiber reinforced polypropylene), the surface member 94 (the foamed layer and the surface layer) was provided. The surface layer was made from PVC (polyvinyl chloride) and the foamed layer was made from urethane foam. The surface member 94 was placed on the part of the surface instrument panel in Comparison 2, and in Comparison 3 the surface member 94 was placed on the whole surface of the instrument panel.

The following are ways of evaluation of the complete performance and function for Experiments 1–6 and Comparisons 1–3.

With the sense of feel, ○ represents the case of having the feeling of pliant (feeling of softness) on touch by hand and having the sense of expansiveness in a high tone upon tapping, x represents the case of having the feel of cheapness and a high tone upon tapping and Δ represents the case of being between that of ○ and x.

With sound insulation, under the condition of sound 103 dB in the engine room, loudness was measured in the inside of the car when the complete instrument panel was simply provided.

With vibration damping, x represents the case of generation of strange oscillatory sounds or clear damage of the product, ○ represents the level of standing for nothing unusual when oscillation in cycle 30 Hz was gained 10$^7$ times with the instrument panel and the instruments placed in a vibration testing machine.

With high-temperature properties, the complete instrument panel was left alone for a half hour at room temperature after being kept for four hours under a fixed atmospheric temperature, and then damaging transformations, melting of the surface and whether or not there were unusualities such as damage and fault hindering to the usual operations were ascertained. The temperature was progressively changed to higher and higher temperatures and the unusual appearance was recorded accordingly.

TABLE 1

| | surface layer | foamed layer | base layer | feeling | sound Insulation | damping | high-temperature properties | number of parts | recycling possibility |
|---|---|---|---|---|---|---|---|---|---|
| *1 | | | | | | | | | |
| Experiment 1 | TPO | — | PPF | Δ | Δ 71.5 dB | ○ | 125° C. | 2 | possible |
| Experiment 2 | TPO | — | PPG | Δ | Δ 71.5dB | ○ | 140° C. | 2 | possible |
| Experiment 3 | TPO | TPO Foaming | HDPE | ○ | Δ~○ 69.5 dB | ○ | 115° C. | 1 | possible |
| Experiment 4 | TPO | TPO Foaming | PP | ○ | Δ~○ 69.5 dB | 120° C. | 1 | possible | |
| Experiment 5 | TPO | TPO Foaming | PPF | ○ | Δ~○ 69.5 dB | | 125° C. | 1 | possible |
| Experiment 6 | TPO | TPO Foaming | PPG | ○ | Δ~○ 69.5 dB | | 140° C. | 1 | possible |
| *2 | | | | | | | | | |
| Comparison 1 | — | — | PPF | x | x 74.5 dB | x | 115° C. | 3 | possible |
| Comparison 2 | (partial) PVC | (partial) polyurethane foaming | NORYL PPG PPF | ○ | x 74.5 dB | x | 115° C. | 4 | impossible |
| Comparison 3 | (entire) PVC | (entire) polyurethane foaming | NORYL PPG PPF | ○ | Δ 71.5 dB | x | 115° C. | 4 | impossible |

NOTE;
*1 → Integrated structure by blow molding
*2 → Conventional structure

Table 1 shows the results of the comparative experiments.

Experiments 3–6 result in possible recycling as the number of parts is just one because of the multi-layer blow molding of the three layers and of the excellent performance of the others.

In Experiments 1 and 2, the surface layer 23 is adhered later so that the number of parts is more than Experiments 3–6, such as two parts, but less that of the past, and recycling is made possible.

On the other hand, Comparison 1 is made possible to recycle due to the usage of one type of material, but is composed of many parts and the faulty performance of others.

Comparisons 2 and 3 bestow the sense of luxury to the surface 94 (foamed layer and surface layer), but is composed of many parts and can not be recycled easily due to the mixture of many kinds of different materials.

The effectiveness of the present invention was conspicuously shown from the above comparative experiments.

As the foregoing description of the present invention, the blow molding having the specified configuration is obtained through the following steps: the tubular parison, in the softened state capable of fusing each other, undergoes the pre-blow with the blow molding apparatus, the tubular parison, undergone with the first blow, is mutually melted at parts of the inner faces by being clamped with the molds so as to form a multiple of isolated hollow portions, and further, the tubular parison undergoes the blow, in which gas is fed from the gas feeding nozzles each provided in the mold into the hollow portions, whereby it is the effect of being able to reduce the number of parts, to be able to recycle easily, furthermore, to be able to form the car interior member with a complicated configuration.

Further, the car interior member has a rib structure, resulting in higher strength and rigidity, and also reduction in weight. Furthermore, the blow molding is pressed against the surface of the cavity of the dies during cooling, resulting in a satisfactory transferring surface quality, non-sinkage and the like, and favorable appearance.

What is claimed is:

1. A method for producing a car interior member, comprising the steps of:
    forming a tubular parison of a molten resin and pre-blowing the tubular parison to inflate the tubular parison;
    clamping the inflated tubular parison between a pair of dies to form a multiple of isolated hollow portions in the tubular parison by mutually welding together portions of inside surfaces of the tubular parison; and
    carrying out a blow molding of the tubular parison by introducing feed gas from a gas feed nozzle provided in the die into each hollow portion to result in a blow molding having a specified configuration.

2. The method for producing the car interior member according to claim 1, wherein the inflated tubular parison is blow molded to form an instrument panel for a frontal area of the car interior.

3. The method for producing the car interior member according to claim 1, wherein at least one of the multiple of the hollow portions has at least one opening for forming a functional part after the blow molding is formed.

4. The method for producing the car interior member according to claim 3, wherein a multiple of the hollow portions are opened at more than two positions to form a duct in the car interior member as a result of the blow molding.

5. The method for producing the car interior member according to claim 1, wherein the blow molding is molded in a state in which a surface member of the car interior member is defined by at least one face a cavity of one of the dies.

6. The method for producing the car interior member according to claim 1, wherein the blow molding is molded from a resin formed from a single material.

7. The method for producing the car interior member according to claim 1, wherein the blow molding is molded from a molten resin formed from layers of different materials.

8. A car interior member manufactured according to the process of: forming a tubular parison of molten resin; pre-blow inflating the tubular parison; and blow molding the inflated tubular parison so as to form a car interior member with multiple isolated hollow portions, at least one of a multiple of said hollow portions being a functional part having at least one opening.

9. The car interior member manufactured according to claim 8, wherein said blow molding of the car interior member is performed so as to form an instrument panel for a frontal area of the car interior.

10. The car interior member manufactured according to claim 8, wherein said blow molding of the car interior member is performed so that the functional part is a duct formed to have at least two openings in at least one said hollow portion.

11. The car interior member manufactured according to claim 8, wherein said blow molding is molded from a molten resin formed from a single material.

12. The car interior member manufactured according to claim 8, wherein said blow molding is molded from a molten resin formed from layers of different materials.

13. The car interior member manufactured according to claim 8, wherein said blow molding is molded from a molten resin that includes more than two layers of material wherein the materials forming the molten resin are selected so that the blow molded car interior member has a rigid base layer located on an inner-most side of the car interior member and a surface layer located on an outer-most side of the car interior member.

14. The method for producing a car interior member according to claim 7, wherein said layers of different material forming said blow molding are blow molded together to form the blow molding in a single blow molding step and the layers of the resin include a first material that forms a rigid base layer, a second material disposed over said first material that forms a foam coating over at least a portion said base layer and a third material that forms a surface coating over the foam layer.

15. The method for producing a car interior member according to claim 14, wherein said first material forming said rigid base layer is a polypropylene resin.

16. The method for producing a car interior member according to claim 14, wherein said second material forming said foam coating is a polyolefin type resin.

17. The method for producing a car interior member according to claim 14, wherein said third material forming said surface coating is a polyolefin type resin.

18. The car interior member manufactured according to claim 12, wherein the layers of the molten resin the car interior member is formed from include a layer of first material that, when molded, forms a rigid base layer, a layer of second material disposed over said first material that, when molded, forms a foam coating over at least a portion said base layer and a layer of third material that, when molded, forms a surface coating over the foam layer.

19. The car interior member manufactured according to claim 13, wherein the layers of the resin the car interior member is formed from include a layer of first material that, when molded, forms said rigid base layer, a layer of second material disposed over said first material that, when molded, forms a foam coating over at least a portion said base layer and a layer of third material that, when molded, forms said surface layer over said foam layer.

20. The car interior member manufactured according to claim 19, wherein the first material forming the rigid base layer is a polypropylene resin.

21. The car interior member manufactured according to claim 19, wherein the second material forming the foam coating is a polyolefin type resin.

22. The car interior member manufactured according to claim 19, wherein the third material forming the surface coating is a polyolefin resin.

* * * * *

UNITED STATES PATENT AND TRADEMARK OFFICE
CERTIFICATE OF CORRECTION

PATENT NO. : 5,714,227
DATED : February 3, 1998
INVENTOR(S) : Minoru SUGAWARA et al It is certified that error appears in the above-indentified patent and that said Letters Patent is hereby corrected as shown below:

```
On the title page, item [73] change Assignee's address
"Ichihara, Japan" to ---Tokyo, Japan---.
Column 14, line 59; after "face" insert ---of---.
Column 15, line  5; change "one of a" to
                    ---one of the---.
```

Signed and Sealed this

Fourth Day of August, 1998

*Attest:*

BRUCE LEHMAN

*Attesting Officer*   Commissioner of Patents and Trademarks